May 2, 1933.  G. GARDNER  1,906,258
GRADING AND LOADING MACHINE
Filed Aug. 5, 1929   5 Sheets-Sheet 1

Inventor
George Gardner
by Hazard and Miller
Attorneys

May 2, 1933. G. GARDNER 1,906,258
GRADING AND LOADING MACHINE
Filed Aug. 5, 1929 5 Sheets-Sheet 3

Inventor
George Gardner
by Hazard and Miller
Attorneys

May 2, 1933.　　　G. GARDNER　　　1,906,258
GRADING AND LOADING MACHINE
Filed Aug. 5, 1929　　　5 Sheets-Sheet 4
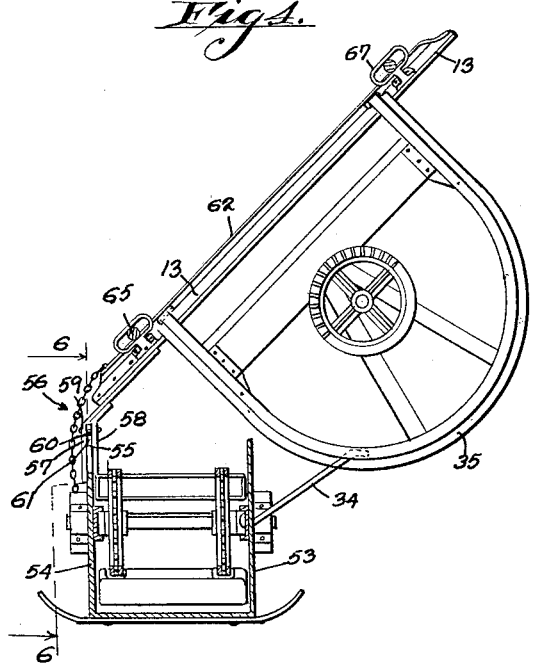
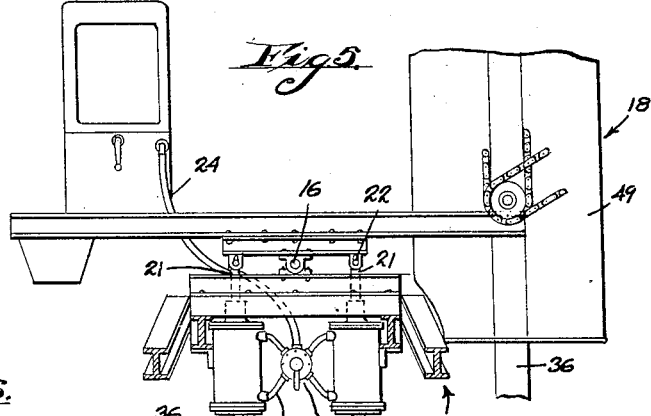
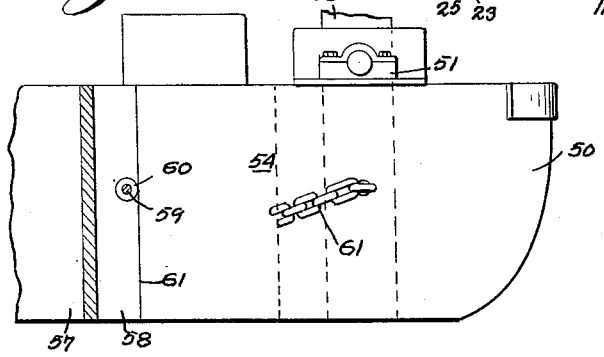

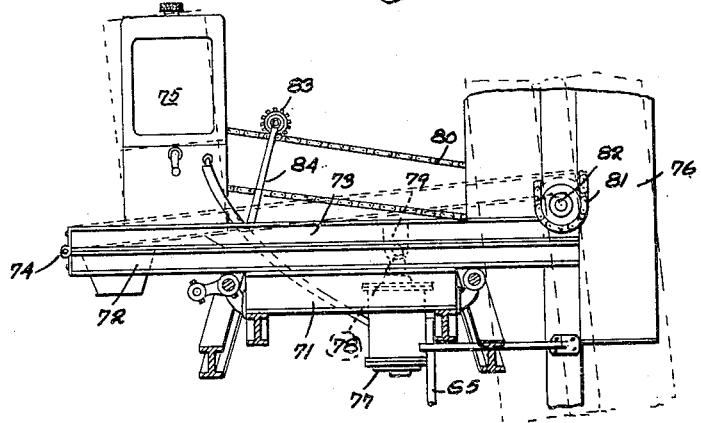
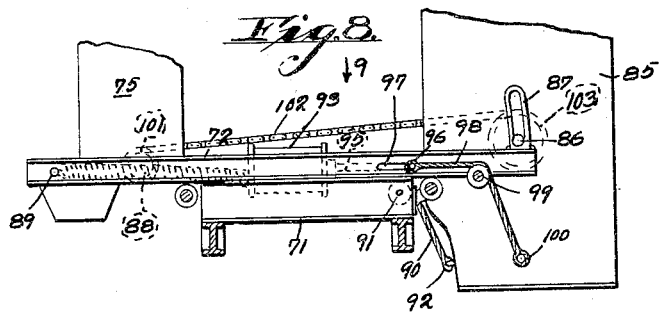
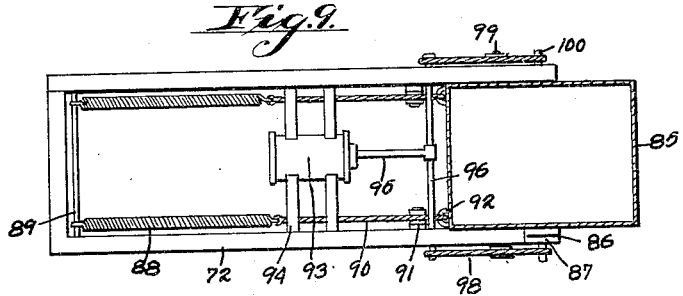

Patented May 2, 1933

1,906,258

UNITED STATES PATENT OFFICE

GEORGE GARDNER, OF REDLANDS, CALIFORNIA

GRADING AND LOADING MACHINE

Application filed August 5, 1929. Serial No. 383,633.

My invention pertains to grading and loading machines of the general type, such as set out in my patent applications, Serial No. 254,429, filed February 15, 1928, now Patent No. 1,800,682, and Serial No. 279,246, filed May 21, 1928, now Patent No. 1,784,666.

The present invention pertains in part to a construction for mounting and balancing the elevator of the loading machine on the framework of the grader and in the manipulation of the elevator to raise or lower same in reference to the grading part of the machine, and in which a hydraulic or fluid operated equipment is utilized to shift the balanced elevator and drive motor; these being carried on a tiltable carrier frame.

Another feature of my invention involves a construction by which the elevator may be made of less height than in my prior applications and by which the trucks receiving the dirt are loaded by the dirt being transferred from the elevating buckets to a continuously moving belt conveyor, the conveyor discharging the dirt directly into the trucks instead of this being discharged through a chute from the buckets.

Another feature of my present invention comprises an effective connection between the boot or hopper at the bottom of the elevator and the blade of the grader, whereby a vertical and a lateral movement of the elevator may be effected relative to the blade and the structure carried by the blade for guiding the dirt moved by the blade into the boot. This construction utilizes guide plates secured to the blade and having a vertical slot between the blades and the boot connected to the elevator has a plate fitting in the slot so that it may have a vertical motion and also a lateral motion. The boot or hopper is preferably pivotally connected to the lower part of the elevator.

Another feature of my present invention involves a linked connection between the elevator and the frame of the grader or grading machine so that proper accommodation may be had for the lifting and depressing of the elevator in reference to the grader frame and still maintain a linked connection which will hold the elevator in the desired relation to the frame and to the grading blade.

Another feature of my invention involves a connection between the elevator and the blade, which allows inclining of the blade to cut the desired camber of the road, but which prevents the tilting over of the blade due to the pressure of its lower edge, this connection being sufficient to allow any of the desired relative movements of the grader frame, the blade and the elevator.

My invention in its various aspects is illustrated in the accompanying drawings, in which, Figure 1 is a perspective view of my machine;

Fig. 4 is a horizontal section taken substantially on the line 4—4 of Fig. 3 in the direction of the arrows;

Fig. 5 is a view substantially similar to part of Fig. 3, showing the control of the carrier frame, omitting other structures;

Fig. 6 is a vertical section on the line 6—6 of Fig. 4 in the direction of the arrows;

Fig. 7 is a part vertical transverse section showing a modified construction of the hydraulic operation of the carrier table;

Fig. 8 is another view giving a further modification of the mounting of the carrier table;

Fig. 9 is a plan of Fig. 8 taken in the direction of the arrow 9.

Figure 1:
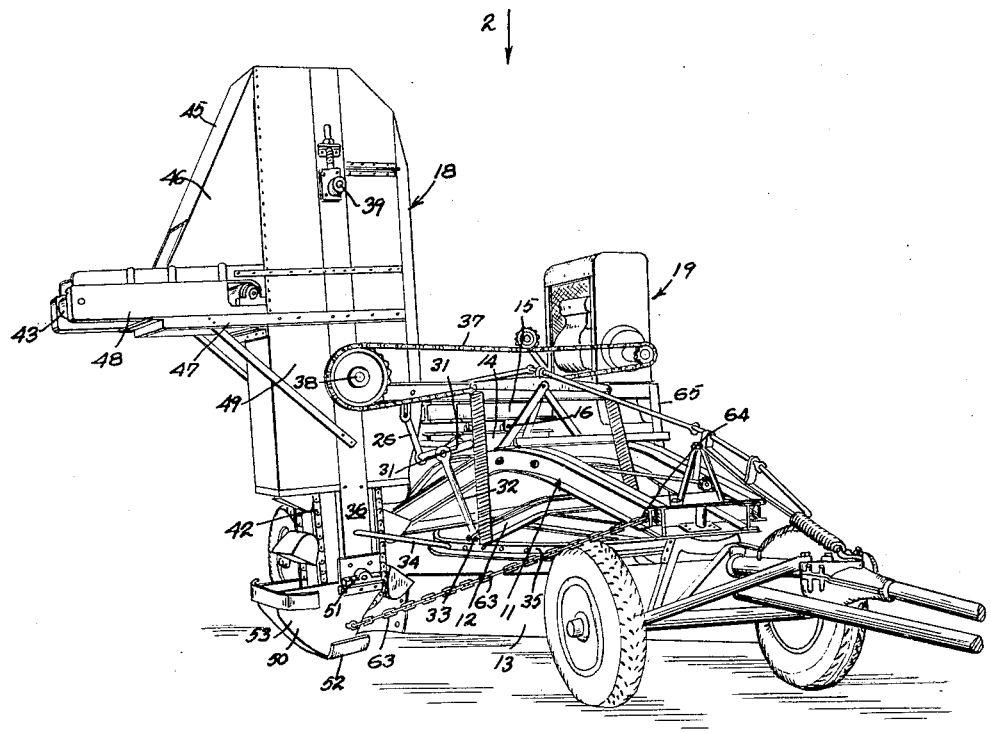

The main features of the machine comprise the grader frame designated generally by the numeral 11, on which is mounted a tiltable cross beam 12. This beam has a connection to the blade 13 so that the blade may be inclined to change the camber of the cuts. Mounted on the grader frame and forming an addition thereto, is a substantial beam construction 14 on which is mounted the carrier frame 15, this having a pivotal mounting 16. A set of hydraulic cylinders 17 are arranged to actuate the carrier frame and on one end of the carrier frame is the elevator assembly 18 and at the other end there is the engine power plant assembly 19 and the counter weight 20. The hydraulic cylinders are operated to tilt the carrier frame in a manner hereunder detailed.

Figure 2:
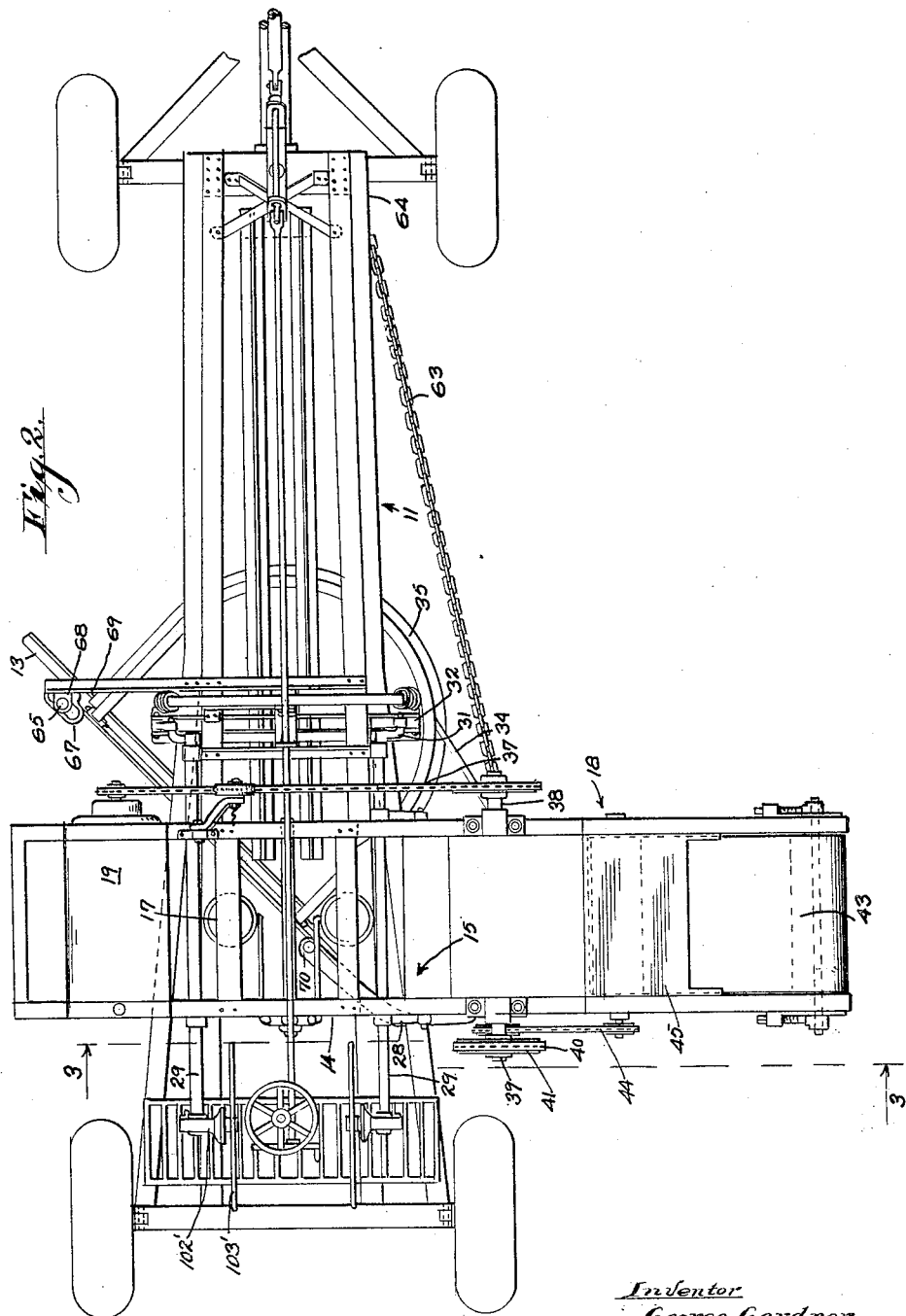
Fig. 2 is an enlarged plan taken in the direction of the arrow 2 of Fig. 1.
Figure 3:
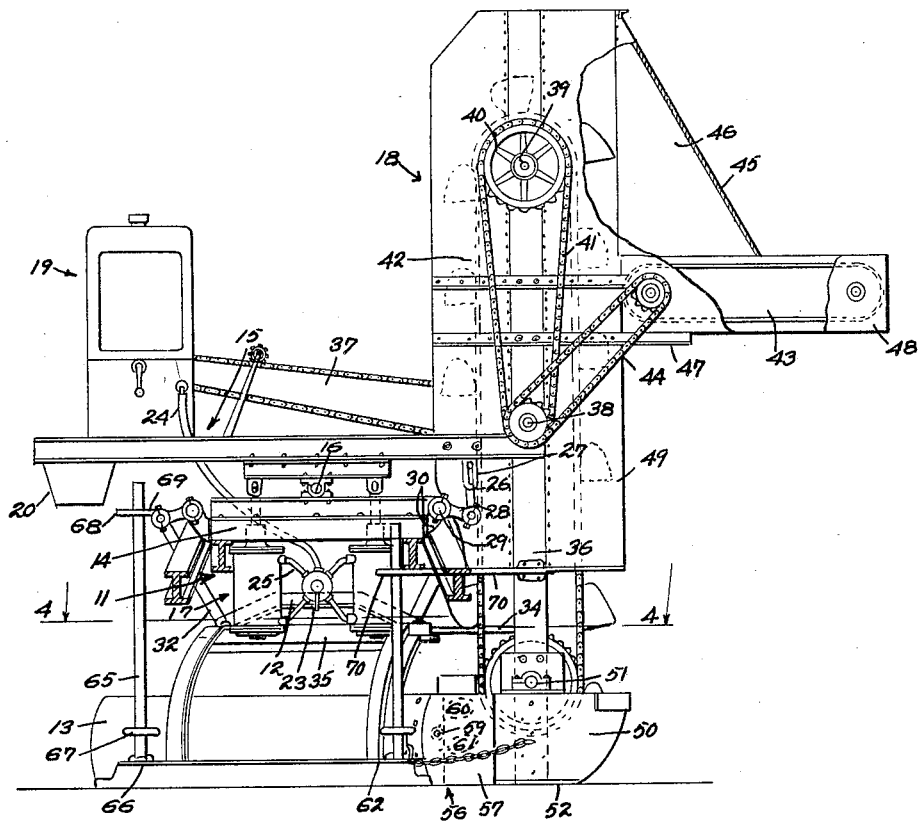
Fig. 3 is a transverse vertical section and partial elevation taken substantially on the line 3—3 of Fig. 2, in the direction of the arrows.

Referring particularly to Figs. 3 and 5, each of the cylinders has a piston therein with a piston rod 21, each having a pin and slot connection 22 with the carrier frame. A control valve 23 is illustrated as having a connection 24 to a source of hydraulic fluid and piping connections 25 to the cylinders. The valve is such that a hydraulic fluid may be introduced in one of the cylinders to raise its piston and into the other to depress the piston, or else to make an exhaust so that the alternating rising and depressing movement of the pistons in the two cylinders gives a rocking action to the carrier frame. The control valve may be positioned adjacent the rear end of the grader part of the machine, behind the carrier frame so as to be readily accessible to the operator as shown in Fig. 2.

In order that a tilting motion may correspond to the tilting of the carrier frame, there are links 26 having a pin and slot connection 27 to the carrier frame. These links are connected to cranks 28 which are attached to longitudinal rock shafts 29. (Note Figs. 1, 2 and 3.) These rock shafts are journaled in the fixed part of the grader frame as indicated at 30 and extend forwardly beyond the carrier frame. At the forward end of each of the rock shafts there is a crank 31 having a connection to lifting and depressing rods 32 which rods at their lower ends are pivotally connected to the beam 12 as indicated at 33. Thus when the hydraulic cylinders are controlled to tilt the carrier frame, the movement of such frame is conveyed to the beam 12 and gives an inclination to the grader blade 13. This blade is connected to the tiltable part of the grader in a standard manner and somewhat as set forth in my patent applications above mentioned.

When it is desired to move the machine from one job to another without grading or elevating the dirt, the carrier frame may be tilted so as to hoist the elevator and if desired the carrier frame may be blocked in this tilted position by suitable blocking so that it will be immaterial should there be any leaks in the hydraulic system. The blade may be lifted for transport from one job to another without cutting in the manner usual with the type of grader machine with which the elevator is connected.

A link 34 connects the tilting semi-circle 35 which is part of the grader with the front post 36 of the elevator. This link is a metal bar having its ends bent to fit through holes in the semi-circle 35 and in the front post 36 of the grader. The elevator is illustrated as having a sprocket chain drive 37 from the engine to the main shaft 38 of the elevator and from this main shaft to the upper shaft 39 having the sprocket wheel 40; the drive being by the chain 41. This operates the buckets which are carried on the endless chain 42, the chain passing over the sprockets at the top and bottom of the elevator. The dirt in being discharged from the buckets at the top of the machine falls on the endless belt conveyor 43 which conveyor is driven by the sprocket chain drive 44 from the main shaft 38. The upper run of the belt conveyor leads the material outwardly.

A side cover 45 and front and rear plates 46 confine the material dumped in the buckets so that it is discharged directly on the moving belt conveyor. This conveyor is supported on an extension frame 47 having beams 48 attached to the main housing 49 of the elevator. By this construction I am enabled to materially lower the height of the elevator as it is not necessary to have the elevator sufficiently high so that the material when discharged into a chute or spout will flow into the trucks.

The bottom connection between the elevator and the plate is substantially as follows, having reference particularly to Figs. 1, 3, 4 and 6. The elevator has a boot or hopper 50 secured by a pivotal connection 51 to the posts 36 of the elevator and has a shoe 52 adapted to slide on the ground. This hopper has a front plate 53 and a back plate 54. The back plate fits in a slot 55 formed in the guide plate construction 56 which is rigidly attached to the blade 13. This guide plate has a rear plate 57 and a front plate 58; there being a stud 59 between these plates with a roller 60 thereon. The roller engages the vertical edge 61 of the plate 54 and therefore accommodates any difference in the elevation of the elevator and the edge of the blade adjacent the boot. In order to prevent a side swing of the lower end of the elevator disengaging the plate 54 from the slot 55, a chain 61 is secured to the plate 54 of the boot and to the angle bar 62 mounted on the blade and the guide plates 56 of the blade. A chain 63 connects the front plate 53 of the boot with the forward end 64 of the fixed frame 11 of the grader.

In order to prevent the tilting of the blade due to the pressure on its lower edge when grading and still allow lifting and lowering of the blade and the inclining for camber cuts, I employ guide rods 65 which are pivotally connected at 66 to the angle bar 62 on the blade. These pass through guide eyes 67 secured to the back of the blade adjacent the upper portion thereof, such guide eyes and the mounting being substantially as shown in my patent application No. 279,246. At the upper end the guide rod 65 on the side remote from the elevator passes through a lug 68 which is mounted on a transverse beam 69; this beam being secured to the fixed frame 11 of the grader, forward of the carrier frame and elevator. The other guide rod mounted on the blade adjacent the elevator extends upwardly through a bar 70 which is secured to the rear side of the elevator.

It will thus be seen that the blade is prevented from a forward tilting motion due to pressure on its lower edge when cutting, but still may be given an inclination for cutting cambers on roads or the like. The guide rods 65 are effectively held at their upper ends and the connection of the rod nearest the elevator allows for the slight movement of the elevator in being lifted and lowered.

In Fig. 7 I illustrate a modification of the mounting of the elevator and engine and in this the fixed frame of the grader is designated 71, having fixed beams 72 mounted thereon. The carrier frame 73 is hinged to the beams 72 by the hinge 74. The engine 75 is mounted adjacent the hinge. The elevator 76 is rigidly connected to the carrier frames 73; the housing of the elevator being riveted or bolted thereto. The raising and lowering of the elevator is effected by the hydraulic cylinder 77 having a piston therein and operating a plunger or piston rod 78; this latter bearing against the underside of the carrier frame 73, the plunger having a head 79 thereon. The drive is by a chain drive or belt drive 80 from the engine to the sprocket or pulley 81 on the shaft 82; this latter shaft being connected to drive the elevator buckets and the belt conveyor in a manner similar to that above described.

In the operation of the construction of Fig. 7, the control of the hydraulic fluid which may be pumped by a pump in the engine mounting, raises or lowers the carrier frame this pivoting on the pivot 74. The movement tilts the elevator slightly from the full line vertical position to the dotted line sloping position, but this is not sufficient to be of any disadvantage in the work. The changing length of the chain or belt 80 may be taken up by a slack taking up sprocket or roller 83 mounted on an arm 84 connected to the carrier frame 73.

In Figs. 8 and 9 I show a construction in which the beams 72 mounted on the frame 71 carry the engine assembly 75 directly. The elevator housing 85 in this case has its drive shaft 86 extending through slotted brackets 87 which are secured to the outer ends of the beams 72. A partial lift is given to the elevator by means of the coil springs 88 secured to a cross bar 89 between the beams 72. These springs have cables 90 attached thereto, which cables pass over pulleys 91 secured between the beams 72, the lower ends of the cables being attached to eyes 92 adjacent the lower part of the elevator. By this construction the tension of the springs exerts a pull on the cables 90 and thus compensates for the weight of the elevator.

The lifting and lowering mechanism for the elevator comprises a hydraulic cylinder 93 mounted in a frame 94 connected to the opposite beams 72 and this has a piston therein with a piston rod 95 connected to a traveling bar 96. This bar operates through a slot 97 in each of the beams 72. The cable 98 is connected to the outer end of this bar 96, each cable passing over a pulley 99 mounted on the beams 72 and attached as indicated at 100 adjacent the lower end of the elevator. In this construction the driving sprocket or pulley 101 for the elevator is mounted at approximately the level of the beams 72 so that the sprocket chain 102 leading to a sprocket 103 on the shaft 86 may be of substantially constant length, no matter at what position the elevator is relative to the beams 72. When the elevator rises or is depressed, it follows the arcuate slot in the lug 87 and the curvature of this slot is made on a radius between the shaft 86 and the shaft of the sprocket 101. In Figs. 7, 8 and 9, the control valve for the hydraulic cylinder is not illustrated as this may be of any suitable type.

In order to allow manual operation of the grader, the rock shafts 29 extend rearwardly of the carrier frame and by a geared connection 102' these rock shafts may be operated by rotatable hand wheels 103'. These hand wheels and their geared connection are common in graders and by operating the wheels, the shafts may be rocked and the blades tilted through the action of the lifting and depressing rods 32.

It will be noted that there is a loose connection from the rock shaft on the side of the machine having the elevator (see Figs. 1 and 3) so that when the carrier 15 is tilted by the operation of the hydraulic cylinders, there is a certain amount of play allowed before the link 26 operates the rock shaft on the side of the machine having the elevator. When the hydraulic equipment starts to rock this shaft it is necessary for the operator on the back of the machine to turn the hand wheel 103' on the side having the elevator to prevent either stripping of the gears or locking of the mechanism for the tilting of the carrier frame which is necessary to raise and lower the elevator. In normal grading operations there is usually a pressure on the ground by the elevator of approximately 200 to 300 pounds for an elevator connected to a standard type of grader.

The loose connections 26 and 27 from one of the rock shafts to the carrier and the connection from the rock shafts to the blade carrying frame allows a certain amount of independent tilting of the blade through the operation of the hand wheels 103 and also when it is desired to move the grader from one job to another or for turning, both of the hand wheels may be operated to lift the blade above the ground. This utilizes features which are known and standard in certain types of graders but the hydraulic equipment cooperates with these to handle the heavy work. The comparatively light work of adjusting the grader blade may be done mainly by hand. This moreover, allows more accurate adjusting of the blade.

Various changes may be made in the principles of my invention without departing from the spirit thereof as set forth in the description, drawings and claims.

I claim:

1. A grader and loader having a vehicle frame with a scraper blade, a carrier horizontally pivotally mounted on the frame and having an engine at one end and an elevator at the other end, a fluid operated means interconnecting the frame and the carrier to tilt the carrier, a rock shaft, a connection between the rock shaft and the carrier, a second connection between the rock shaft and the blade, whereby on tilting the carrier the blade is also tilted.

2. In a grader and loader having a blade and an elevator with a hopper to receive dirt from the blade, a structure interconnecting the blade and the hopper, having a vertical slot with a plate engaging therein, the plate having a vertical movement in the slot and a slight lateral movement.

3. In a grader and loader having a blade and an elevator with a hopper receiving dirt from the blade, a structure interconnecting the blade and the hopper having a vertical slot with a plate fitting therein, a roller in the slot engaging the edge of the plate, and a flexible connection between the blade and the hopper allowing slight lateral movement of the hopper relative to the blade.

4. In a grader and loader having a vehicle frame, a blade tiltably connected thereto to make camber cuts, an elevator having a hopper to receive dirt discharged by the blade, means to prevent inclination of the blade due to pressure at its lower edge, comprising a rod having a pivotal connection to the blade and extending through a slotted structure connected to the blade, such slotted structure allowing tilting of the blade for camber cuts and a structure having an aperture through which the top of the rod extends, said structure being connected to the elevator.

5. In a grader and loader having a vehicle frame, a tiltable frame connected thereto carrying a blade, an elevator connected to the vehicle frame, means to tilt the frame carrying the blade, means to raise and lower the elevator and a linked connection between the elevator and the frame carrying the blade.

6. A grader and loader having a vehicle frame with a scraper blade, a carrier horizontally pivotally mounted thereon, an elevator on the carrier, a fluid operated connection between the frame and the carrier to tilt the carrier to raise and lower the elevator, manually operated means to tilt the blade to vary the camber of the cut, and a loose interconnection between the carrier and the means to raise and lower the blade.

7. A grader and loader having a vehicle frame with a scraper blade, a carrier horizontally pivotally mounted on the frame and having an elevator at one end, a fluid operated means interconnecting the frame and the carrier to tilt the carrier to raise and lower the elevator, rock shafts extending longitudinally of the frame, an interconnection from the rock shafts to the blade, means to manually operate the rock shafts to vary the tilting of the blade to change the camber cut, and a loose interconnection between at least one of the rock shafts and the carrier.

8. A grader and loader having a vehicle frame with a scraper blade, a carrier frame horizontally pivotally mounted thereon to extend transversely across the vehicle frame, an engine on one end of the carrier frame, an elevator on the opposite end of the carrier frame having a hopper to receive dirt from the blade, a pair of cylinders rigidly mounted on the vehicle frame and having piston rods with connections to the carrier frame, means to actuate the pistons to tilt the carrier frame and thereby raise and lower the elevator.

9. A grader and loader as claimed in claim 8, a mechanical connection between the carrier frame and the blade to tilt the blade in the movement of the elevator and hopper.

10. In a grader and loader, a vehicle frame having a scraping blade, an elevator having a hopper at the bottom connected thereto by a jointed connection, the hopper having a loose fit to the blade to permit a vertical raising and lowering of the hopper relative to the blade, said loose fit permitting lateral movement of the hopper relative to the blade, and the joint connection of the hopper and elevator permitting such lateral movement of the hopper, and means to limit the movement of the hopper relative to the blade.

11. In a grader and loader having a scraping blade, an elevator, a hopper connected thereto by a hinged joint, said blade discharging into the hopper, a structure interconnecting the blade and the hopper and having a vertical slot with one side of the hopper fitting therein and allowing vertical movement of the hopper and elevator relative to the blade, said slot and plate connection of said structure and hopper permitting lateral movement of the hopper relative to the blade, and the hinged connection from the hopper to the elevator permitting movement of the hopper laterally relative to the elevator, and a restraining means connecting the hopper and the blade to limit the lateral movement of the hopper.

12. In a grader and loader, a vehicle frame having a blade with means to tilt such blade, an elevator having a hopper connected thereto, means to raise and lower the elevator with the hopper, a loose connection between the blade and the hopper permitting vertical movement of the hopper and elevator relative to the blade, or tilting movement of the blade relative to the hopper, said connection permitting a lateral movement of the hopper relative to the blade, and means to restrain the lateral movement of the hopper relative to the blade.

13. In a grader and loader having a scraper blade with means to tilt such blade, an elevator having a hopper connected thereto by a hinged connection, the blade discharging into the hopper, means to raise and lower the elevator and hopper, an interconnecting structure between the blade and the hopper and secured to the blade and having a vertical slot with a plate on the hopper fitting in said slot, said vertical slot connection permitting raising and lowering of the elevator relative to the blade or tilting of the blade relative to the hopper, said slot connection also permitting a lateral movement to the hopper relative to the interconnecting structure and the blade, and the pivotal construction of the hopper and elevator permitting an angular movement of the hopper relative to the elevator, and a restraining means relative to the hopper and the blade to restrain the lateral movement of the hopper and the pivotal movement thereof on the elevator.

In testimony whereof I have signed my name to this specification.

GEORGE GARDNER.